(12) United States Patent
Siddiqui et al.

(10) Patent No.: US 9,104,964 B1
(45) Date of Patent: Aug. 11, 2015

(54) DATA ESTIMATION OF HISTORICAL DATA THAT IDENTIFIES FINE GRAINED TIME PERIOD DATA AND COARSE GRAINED TIME PERIOD DATA AND APPLIES CORRELATED SLOPES TO TIME PERIODS

(71) Applicant: Amazon Technologies, Inc., Reno, NV (US)

(72) Inventors: Muhammad Ali Siddiqui, Snoqualmie, WA (US); Charles Graham Haver Crissman, Seattle, WA (US); Sanjeev Kewal Verma, Seattle, WA (US); Mark Christopher Veronda, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 375 days.

(21) Appl. No.: 13/679,890

(22) Filed: Nov. 16, 2012

(51) Int. Cl.
*G06F 15/18* (2006.01)
*G06N 5/02* (2006.01)
*G06F 3/06* (2006.01)

(52) U.S. Cl.
CPC ............... *G06N 5/02* (2013.01); *G06F 3/0652* (2013.01)

(58) Field of Classification Search
CPC .......... G06F 2221/2143; G06F 3/0652; G06F 3/0653
USPC ................................................ 706/12, 45, 62
See application file for complete search history.

(56) References Cited

U.S. PATENT DOCUMENTS

| | | | | |
|---|---|---|---|---|
| 7,774,191 | B2 * | 8/2010 | Berkowitz et al. | 703/23 |
| 8,010,738 | B1 * | 8/2011 | Chilton et al. | 711/103 |
| 2009/0031150 | A1 * | 1/2009 | Koga | 713/300 |
| 2009/0144102 | A1 * | 6/2009 | Lopez | 705/7 |
| 2010/0082417 | A1 * | 4/2010 | Wu | 705/14.18 |
| 2012/0116747 | A1 * | 5/2012 | Hadar et al. | 703/22 |

* cited by examiner

*Primary Examiner* — David Vincent
(74) *Attorney, Agent, or Firm* — Thorpe North & Western (57) ABSTRACT

A method is provided for estimating past data by identifying a high frequency data set for a defined time period. A pattern is calculated for the high frequency data set and then the pattern is applied to a low frequency data set in a past time period to estimate a high frequency query point.

8 Claims, 7 Drawing Sheets

DATA ESTIMATION OF HISTORICAL DATA THAT IDENTIFIES FINE GRAINED TIME PERIOD DATA AND COARSE GRAINED TIME PERIOD DATA AND APPLIES CORRELATED SLOPES TO TIME PERIODS

BACKGROUND

The accuracy and reliability of systems and processes that use historical data may increase when a sufficiently large collection of data captured at frequent intervals is available. However, storing large volumes of data for long periods may result in increased costs that may be prohibitive. When data is discarded as a matter of retention policy, mistake, or disaster, the absence of historical data may affect other systems that consume historical data.

For example, a major website operator may have tens of millions of visitors view a website each year. Metrics of various types may be captured related to website access and stored so the information may be used by other systems and processes. Such metric data may be sampled at certain time intervals. These samples may be taken, for example, at one minute, five minute, one hour and one day intervals. Each unit of data may contain information about some metric, e.g. web server load or purchase orders placed, at the sample time that the unit of data is captured.

The amount of storage used to store a day's worth of one minute data is significantly more than what is used to store a day's worth of one hour data. Because of the load that storing one minute data places on resources, retention policies may be put in place defining that data captured at frequent intervals, like one minute data, be discarded over time in favor of data sampled at a lower interval that may use less storage, such as one hour data. The one minute data may then be purged from the data store and may no longer be available to systems and processes that would benefit from the existence of the data.

DETAILED DESCRIPTION

A technology is described for estimating or re-generating historical data. For example, an estimation of historical fine grained data may be generated using stored data. The stored data may be coarse grained data and fine grained data. One or more slopes for the fine grained stored data may be calculated and then the slopes may be correlated to create a correlated slope. The correlated slope may be applied to a past time period to estimate historical fine grained data and may be constrained to a data range defined by historical coarse grained data. In addition, the estimated fine grained data may be modified by data seasonality that is identified in the existing fine grained or coarse grained data. In one configuration, coarse grained data and fine grained data may be server or computing metrics that are obtained about server hardware and/or software performance.

Fine grained data that is no longer available, either due to retention policies that purge fine grained data from data archives, or due to mistake, malfunction, disaster or other reason, may be estimated by using a plurality of slopes derived from existing fine grained data. The slopes may be correlated and the resulting correlated slope may be applied to historical coarser grained data of a past time period. In this technology, fine grained data may be data that is observed or sampled at more frequent intervals (e.g., one second, one minute, or five minutes). Coarse grained data may be data that is observed or sampled at less frequent intervals (e.g., one hour, one day, or one week). Fine grained data may use significantly more storage space than used for the storage of coarse grained data because of the frequency of observation.

For example, a policy may be set that due to storage costs involved in storing large amounts of data, fine grained data such as one minute metric data may be retained for five weeks. After five weeks, the one minute metric data may be discarded in favor of continuing to store a coarser grained level, such as one hour metric data, after which the one minute metric data may be purged from the data store and may no longer be available. This fine level of granular metric data may later be estimated by computing at least one slope for one minute granularity data from a stored time period. This slope may be extended back to a past time period where one hour granularity data exists to estimate one minute granularity metric data. Alternatively, multiple time periods may be identified in the one minute granularity data and multiple slopes may be calculated for each time period. These multiple slopes may be correlated together to form the correlated slope and then applied to the past time period using the historical one hour granularity data. The correlation may include taking a mean of the slopes, using the highest slope, using the lowest slope, interpolating the slopes and other slope correlation methods. Once the correlated slope has been applied to the past time period using historical one hour granularity data as a bound, then estimated one minute granularity data may be identified. The terms historical and past may be used interchangeably throughout this discussion.

Figure 1:
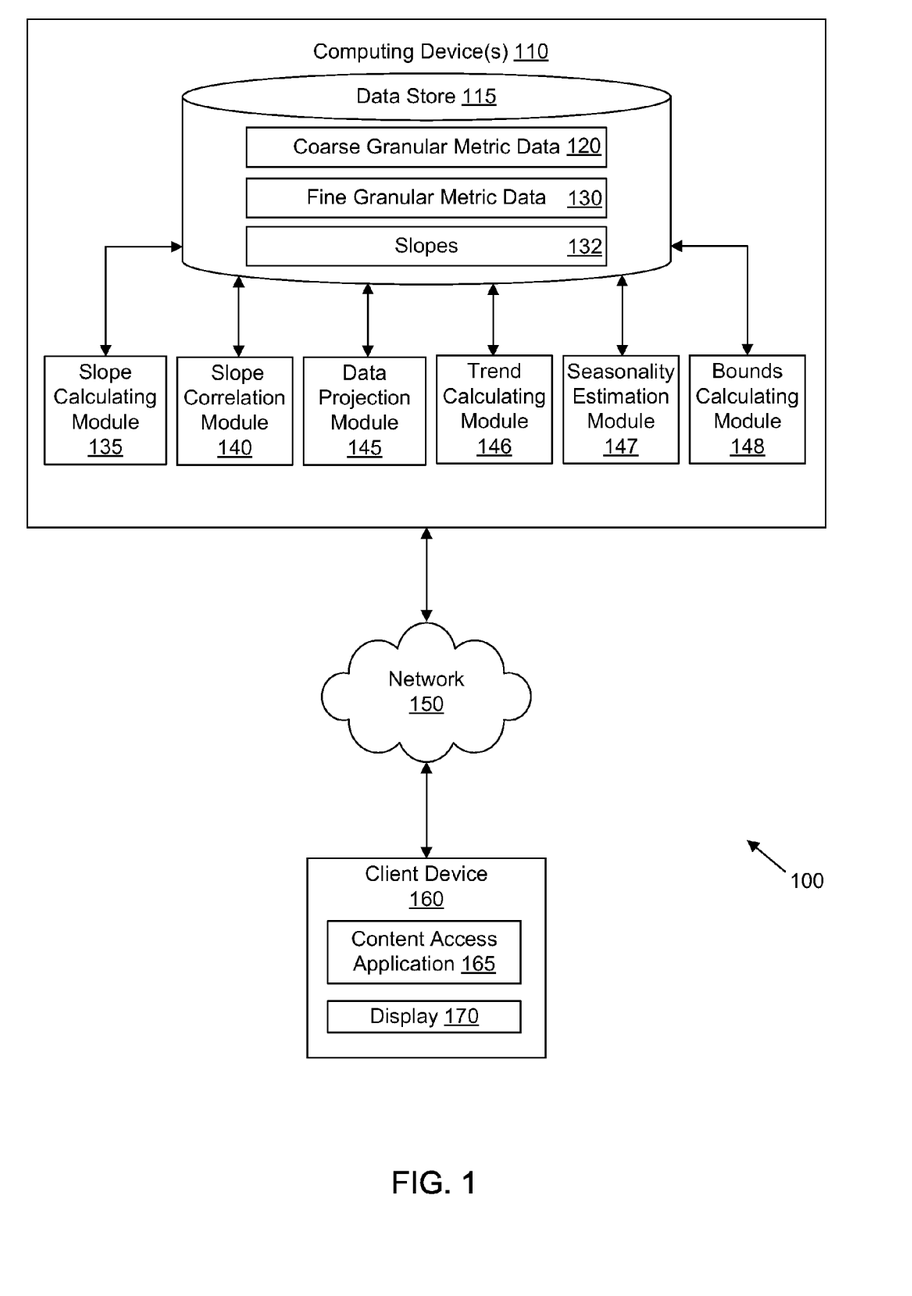
FIG. 1 is a block diagram illustrating an example system for estimating historical data.

FIG. 1 provides an example of a networked computing environment 100 for this technology. The networked computing environment 100 may include one or more computing devices 110 in data communication with one or more devices 160 by way of a network 150. The network 150 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

The computing device 110 may comprise, for example, a server computer or any other system providing computing capability. Alternatively, a plurality of computing devices 110 may be employed that are arranged, for example, in one or more server banks or computer banks or other arrangements. For purposes of convenience, the computing device 110 is referred to in the singular, it is understood that a plurality of computing devices 110 may be employed in the various arrangements as described above.

Various processes and/or other functionality may be executed in the computing device 100 according to various embodiments. Also, various data may be stored in a data store 115 that is accessible to the computing device 100. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 115 may include storage systems such as a SAN (Storage Area Network), cloud storage network, volatile or non-volatile RAM, optical media, or hard-drive type media. The data store 115 may be representative of a plurality of data stores 115 as can be appreciated.

The data stored in the data store 115 may include, for example, coarse granular metric data 120, fine granular metric data 130 and any other granularity level or combination of granular metric data. Non-limiting examples of metric data stored by the data store 115 may include metrics about virtual servers, physical servers, web services and other computing metrics. For example, metrics about processes, website hits, page views, visits (first, unique, repeat), retail orders, transaction requests, sessions, bounce rates, exit rates, average page depth, clicks, CPU (central processor unit) load, average queue sizes, average request sizes, I/O (input/output) status, wait times, utilization, bounds, buffers, caches and other metrics that may be recorded.

The granularity of data that is stored in the data store 115 may be determined by the interval of time at which the metric information is captured or sampled. For example, coarse granular metric data 120 may include metric data that represents website activity sampled or collected over a period of one hour, multiple hours, one day, or multiple days. Whereas, fine granular metric data 130 may include metric data that represents website activity sampled at a period of one minute, five minutes, or some multiple of minutes.

Alternatively, coarse granular metric data 120 may be composed of an aggregation of fine granular data 130 that has been summarized to represent a larger period of time. Using website traffic metrics as an example, one minute of fine granular metric data 120 may show that five thousand unique visitors visited a website during a one minute period of time. The next minute of activity may show three thousand unique visitors visited the website during that time period and the minute after that might show eight thousand unique visitors visiting the website and so forth. An aggregation of the one minute fine granular metric data 130 just described, aggregated over a period of five minutes, may show that 29 thousand unique visitors visited the website over a five minute time span. In this example, fine granular metric data 130 (e.g. one minute metric data) may be aggregated or summarized to form coarser granular metric data 120 (e.g. three minute metric data).

Certain modules may be executed on the computing device 110 to perform desired functions for the technology. For example, the computing device 110 may include a slope calculating module 135, a slope correlation module 140, a data projection module 145, a trend calculating module 146, a seasonality estimation module 147, a bounds calculating module 148 from selected time periods and other services, processes, systems, engines, or functionality not discussed in detail herein. The slope calculating module 135 may calculate a slope for granular metric data for a determined time period. The slope correlation module 140 may obtain a plurality of slopes which the slope correlation module 140 correlates to form a correlated slope.

The slope calculating module 135 may obtain granular metric data for a defined time period from the data store 115. The granularity of the metric data obtained may be of any granularity, for example, coarse granular metric data or fine granular metric data may be obtained. For example, the slope calculating module 135 may calculate a slope for fine granular metric data based upon the defined time period for the fine granular metric data and the change in slope for the data points in the defined time period. Identification of a slope for data points of a time period may be performed using existing methods for inferring slope from a group of points. For example, an algebraic computation may be applied to a plurality of data points to compute a line which provides the slope or more complex slope computations (e.g. higher order or statistical) may be used.

Different methods may exist for calculating a slope for granular metric data and one non-limiting example may now be described. The slope calculating module 135 may obtain a plurality of metric data sets for the same defined time period for which the slope calculation module 135 may calculate a slope for each metric data set obtained. For example, the slope calculating module 135 may obtain multiple fine granular metric data sets and calculate a slope for each of the fine granular metric data sets 130. The resulting slopes 132 may be stored back to the data store 115 for use by other modules and processes, if desired.

The slope correlation module 140 may obtain the slopes from the data store 115 that may represent slopes of fine granular metric data sets. The slopes from the fine granular metric data sets may then be correlated to form a correlated slope. The correlation may include taking a mean of the slopes, using the highest slope, using the lowest slope, interpolating the slopes, clustering multiple slopes and picking a center of the slopes and other slope correlation methods. As an example, the slope correlation module 140 may obtain a first fine granular metric data slope that represents 12:00 PM to 12:05 PM of Monday, January 8 of the current year and a second fine granular metric data slope that represents 12:00 PM to 12:05 PM of Monday, January 1 of the current year. The first fine granular metric data slope may be correlated to the second fine granular metric data slope to form a correlated slope that represents 12:00 PM to 12:05 PM on the selected Mondays of the current year at a fine granular level. The correlated slope may be stored back to the data store 115 for use by other modules and processes.

A trend that shows whether a slope is positive or negative may be calculated using the trend calculation module 146. The trend then may be used by other processes and modules in applying the slope (e.g., verification of the slope or ensuring that the slope is being applied correctly).

Cyclic variation, otherwise known as seasonality may be estimated for the multiple fine granular data sets. The seasonality estimation module 147 may be used to determine tendencies in the data and then changes may be made to the slope or slope range to fit the identified seasonality. To illustrate, an anomaly may be known to occur at regular intervals that causes a metric, for example a server processing load, to increase above or decrease below expected rates for that time period. This estimated seasonality may be used when applying the correlated slope to a past time period to generate estimated data. In addition, seasonality may exist in the data that represents certain demographic movements, popularity tendencies, cultural leanings, calendar year seasonality or other identifiable seasonality in the data that may be accounted for by adjusting the slope or slope range to fit the seasonality.

The data projection module 145 may apply a slope from a time period from which the slope was calculated to a past time period. The two time periods may be related, partially related or unrelated. For example, currently stored data from January 10$^{th}$ may be available to infer a slope to January 10$^{th}$ in a past year, illustrating potentially related time periods. However, data from January 10$^{th}$ may be used to infer a slope to June 10$^{th}$ even though the periods are partially related (e.g., related by the date in the month) and the accuracy for inferring data for the past date may be lower. Furthermore, data from January 10$^{th}$ may be used to infer data to December 25th (which is a holiday in some countries) and thus the time periods may be unrelated and the inferred data is less likely to be accurate.

The data projection module 145 may obtain the correlated slope for a defined time period from the data store 115. The correlated slope may be used to estimate a fine granular metric data point within a historical data set for a related past time period. For example, the data projection module 145 may obtain a correlated slope that represents a slope for a time period of 12:00 PM to 12:10 PM of January 1 of the current year. The data projection module 145 may take the correlated slope and infer or apply the correlated slope to a coarse granular historical data set that represents 12:00 PM to 12:10 PM of January 1 of the previous year, from which at least one fine granular metric data point is derived. Since actual fine granular data does not exist for January 1 of the previous year, the slope may be used to infer a data point for the past time period. For example, a query for the fine granular metric data point may be a request to determine a processing load in a server at 12:48 PM on January 1 in the previous year. In this case, an upper and lower bound may have been identified from the past coarse granular data for the server processing load (e.g., processing load was between 12 PM and 1 PM on January 1) and the slope may be set to fit between the upper and lower bounds. Thus, the slope may be used to infer a processor load of 38% at the specific time of 12:48 PM. This determination may be made even though there are no stored data points on a minute by minute basis for the past time period. Further, the maximum bound limit and/or the minimum bound limit identified using the past coarse granular data in the past time period may be used as a constraint on an estimated query point. This may also place a limitation on the application of the correlated slope and may prevent unexpected or erratic results when applying the correlated slope to estimate a data query point.

Level is another type of bound that may be used to limit the application of the correlated slope and prevent unanticipated behavior. A level may be computed by applying the seasonality of one or more fine granular metric data sets to a course granular metric data set. Some non-limiting examples of calculating a level may include using an exponential moving average calculation, computing an average using one or more time periods that are immediately before or after the time period for which the level is being calculated, or by using a fine granular metric data set from a current time period.

In a further example, the stored coarse granular metric for the past time period may be a mean processor load value. In this case, the correlated slope may use the mean value of the maximum and minimum bound limit from the past coarse granular data in the past time period as an anchor for the correlated slope.

While the examples described for this technology have explained that one query point or metric may be estimated, multiple data query points or an entire series of data query points may be estimated within past time periods. Multiple data query points that have been estimated may be stored in a data store or sent to another process for consumption. For instance, these estimated data points may then be consumed by forecasting models including regression variants or Gaussian Processes to generate one and five minute forecasts for a retail website for a two year period.

Certain processing modules may have been discussed in connection with this technology. In one example configuration, a module may be considered a service with one or more processes executing on a server or other computer hardware. Such services may be centrally hosted functionality or a service application that may receive requests and provide output to other services or devices.

A client device 160 may be coupled to the network 150. The client 160 may comprise, for example a processor-based system such as a computer system. Such a computer system may be a device such as, but not limited to, a desktop computer, a laptop computer, tablet computer system, or other devices with like capability. The display 170 may comprise, for example, one or more devices such as cathode ray tubes (CRTs), liquid crystal display (LCD) screens, gas plasma-based flat panel displays, LCD projectors, or other types of display devices, etc. The content access application 165 is executed to obtain and render display metric data from the data store 115 and the results of calculations performed upon metric data. Further, the client device 160 may be used to run forecasting models that utilize data stored on the data store 115. While FIG. 1 illustrates an example of a networked environment 100 that may implement the techniques above, many other similar or different environments are possible. The example environment discussed and illustrated above are merely representative and not limiting.

As discussed previously, the practice of purging data that is captured at frequent intervals may pose a problem for forecasting models. For example, some forecasting models may use historic data to learn seasonality and the accuracy of these models is dependent upon data being available to the system to consume. In other words, more historically available data may make identifying repeating patterns over a long period of time easier for forecasting models. For instance, if a website retailer wants a forecast of how many orders will be placed on December 23$^{rd}$ at 8:30 PM a year from now, previous years of historical order data from the same day and time may be used in order to produce a reliable forecast. Without access to historical data, forecasting models lack sufficient history to provide users with any kind of forecast that is of value. The present technology aids in accessing historical data as requested for forecasting, planning, reporting and other purposes.

Figure 2A:
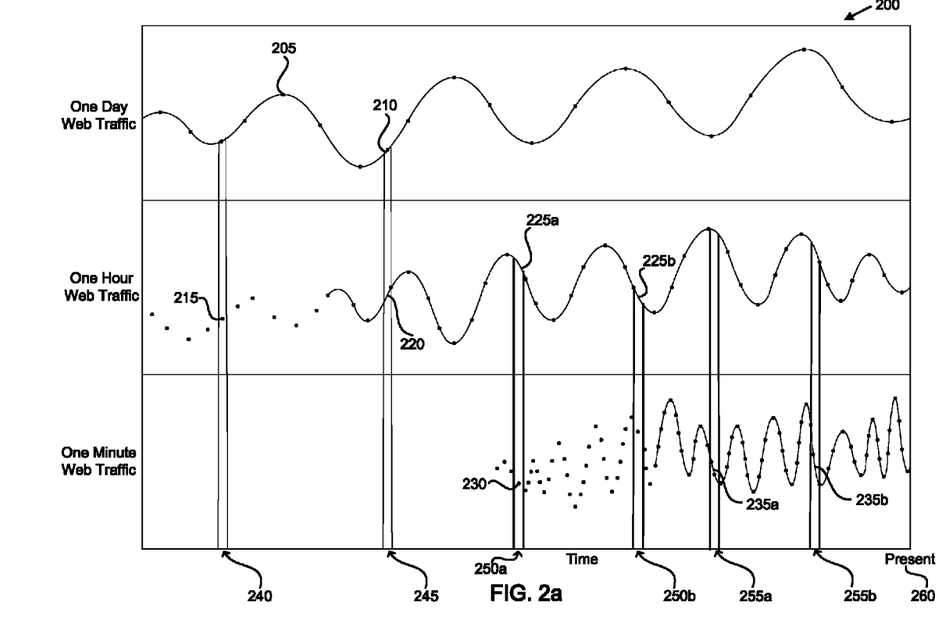
FIG. 2a is a graph illustrating an example of a method for estimating historic data.

FIG. 2a shows one example of a graph 200 displaying a visual representation of granular metric data and the process of generating finer granularity data that may be used by data consuming processes. For example, the graph 200 may display varying levels of metric data granularity, such as one day web traffic 202, one hour web traffic 204 and one minute web traffic 206. Web traffic may refer to any sort of activity that occurs on a web server. In this example, the finest level of granularity contained in the graph 200 is one minute web traffic 206. One hour web traffic 204 is a coarser level of metric granularity, with one day web traffic 202 being the coarsest level of metric granularity illustrated here. As was discussed previously, metric data may not necessarily be captured as a continuous stream of information, to do so may use significant amounts of storage space. Instead, metric data may be captured as a sample within a time interval or several samples within a time interval. These samples may be captured frequently or infrequently depending upon the environment and available resources. The graph 200 shows several granular levels of metric web traffic over time, starting from the present 260 and extending backwards into the past. The metric web traffic example is characterized as a waveform containing metric data points 205 that occur along the waveform. Moving back in time, the waveform signal may begin to fade as finer granular metric data is not available. In practice, such data waveforms may be noisier but FIG. 2a has been simplified for illustration purposes.

The graph 200 shows a plurality of defined time periods 250a-b and 255a-b and corresponding coarse and fine granular metric data sets, one hour web traffic data sets 225a-b and one minute web traffic data sets 235a-b. Due to the fine granularity of the data, the one minute web traffic data sets 235a-b may contain several metric data points, whereas the granularity of the one hour web traffic data sets 225a-b may be coarser and may contain fewer data points within a given time period. For example, if the defined time periods 250a-b and 255a-b is a span of one hour, the one minute website traffic data set 235a-b may contain up to sixty data points (i.e., one data point per minute) and the one hour web traffic data set 225a-b may contain one data point (i.e., one data point per hour).

After the fine granular metric data sets are identified above, a slope may be calculated for each one minute web traffic data set 235a-b. For example, a slope may be calculated for a first one minute web traffic data set 235a-b that occurred on Monday at 8:35 PM of the current week and another slope may be calculated for a second one minute web traffic data set 235a-b that occurred on Monday at 8:35 PM of the previous week. Slope calculation may be based upon the defined time period 255a-b and the change in slope throughout that defined time period. As will be appreciated, different methods may exist for calculating a slope as discussed earlier. The result of the slope calculation process is a plurality of slopes that may represent one minute web traffic slopes for a plurality of defined time periods 255a-b.

The slopes may be correlated with each other to create results that may be used in the next process. For example, the slopes representing the one minute web traffic data sets 235a-b may be correlated and differences in the slopes that may exist may be reconciled by the correlation. The correlation of the slopes forms a correlated slope which for example, may represent a slope of web traffic for the defined time periods 255a-b.

Having the correlated slope, a past time period 250a or b may be identified where the correlated slope may be inferred into a coarse granularity data set of one hour web traffic 225a or b that exists within the past time period 250a or b. In addition, the identified past time period 250a or b may be related to the defined time period 255a or b. For example, if the defined time period 255a is defined as 12:00 PM to 12:05 PM on Monday of the current week, then the past time period 250a may be defined as 12:00 PM to 12:05 PM on Monday of the previous week, or the past time period 250a may be the same time on Monday five weeks ago. As will be appreciated, the related past time period may occur anytime in the past if there is a relationship between the defined time period 255a and the past time period 250a. In another example, the defined time period 255a and the past time period 250a may be partially related or unrelated. After the past time period 250a is identified, the correlated slope may be inferred into the one hour web traffic data set 225a contained within the past time period 250a. The results of this inference then may be used to estimate a fine granularity query point 230 for one minute web traffic that is no longer stored in a data store.

In an example, seasonality may be used to determine whether tendencies in the one minute web traffic data sets 235a-b and one hour web traffic data sets 225a-b exist, making it possible to make changes to the correlated slope to fit the identified seasonality as discussed earlier.

In an example, an upper and lower bound may have been identified from the coarse metric data set of one hour web traffic 225a and the correlated slope may be set to fit between the upper and lower bounds. Further, the maximum bound limit and/or the minimum bound limit identified using the coarse metric data set 225a in the past time period 250a may be used as a constraint on an estimated query point. This may place a limitation on the correlated slope and may prevent unexpected or erratic results when applying the correlated slope to estimate a fine granularity data query point.

In another example, the one hour web traffic metric for a past time period 250a may be a mean value. In this case, the slope may use the mean value of the maximum and minimum bound limit from the one hour web traffic data set 225a in the past time period 250a as an anchor for the correlated slope.

As will be appreciated, the processes above may be repeated within an iterative routine that is capable of generating data points 205 that extend back in time for as long as there is historic coarse granular metric data available.

The processes described above may also be used to estimate other levels of granular data where an existing level of coarser granular metric data exists. For example, a defined time period 245 may be identified containing a data set of one hour web traffic 220 and a data set of one day web traffic 210. The same processes as described previously may calculate a slope for a plurality of one hour web traffic data sets 220. The slopes then may be correlated to create correlated slopes that then may be inferred into a related past time period 240. The results of this inference then may be used to estimate a data point 215 or a series of data points that may exist within a data set of one hour web traffic 220.

Figure 2B:
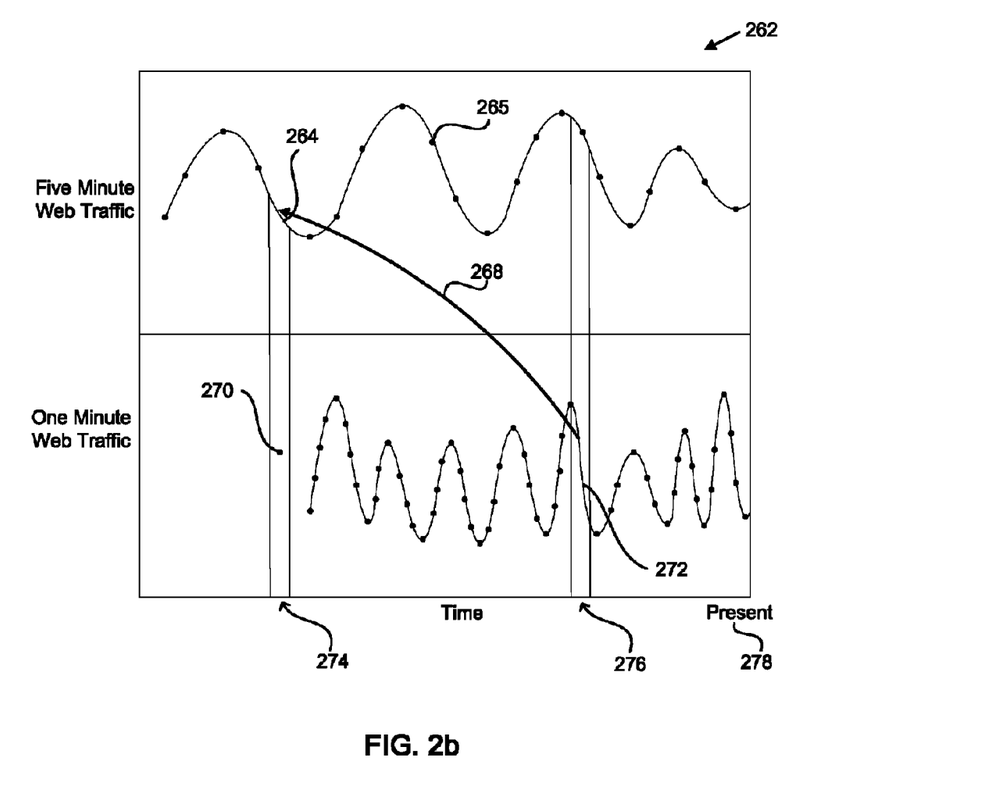
FIG. 2b is another graph illustrating an example of a method for estimating historic data.

FIG. 2b shows another example of a graph 262 displaying a visual representation of two levels of granular metric data starting at the present 278 and going back in time. In this example of estimating finer granularity metric data, the finest level of granularity contained in the graph 262 is one minute web traffic 272, with five minute traffic 264 being a coarse level of metric granularity.

A fine granular metric data set of one minute web traffic 272 may be identified within a defined time period 276. A slope may be calculated for the one minute web traffic data set 272 based upon the defined time period 276 and the slope may then be applied 268 to a past coarse granular data set 264 of five minute web traffic 265 within the defined time period 274. The results of this application then may be used to estimate a data point 270 in response to a query for one minute web traffic that is no longer stored in a data store.

Figure 3:
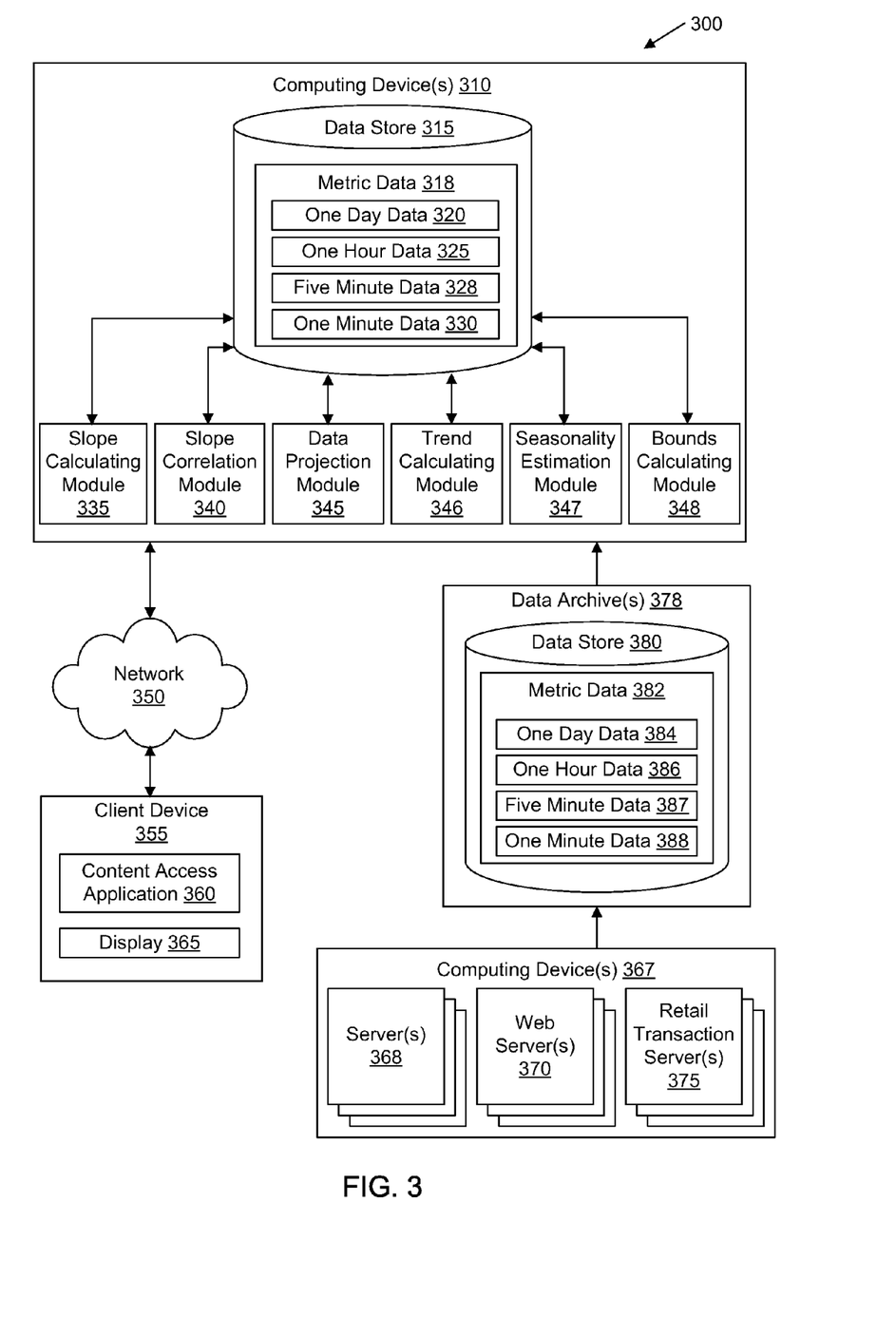
FIG. 3 is a block diagram illustrating another example system for estimating historical data.

Turning now to FIG. 3, another example of a distributed computing environment is shown utilizing several computer systems and components that are interconnected via communication links, using one or more computer networks or direct connections. However, such a system could operate equally well in a system having a fewer or a greater number of components than are illustrated in FIG. 3. Thus, the depiction of the computing environment 300 in FIG. 3 should be taken as being illustrative in nature and not limiting to the scope of the disclosure.

The computing environment 300 may include additional components and/or other arrangements. In this example, the computing environment 300 includes one or more computing devices 310 in data communication with one or more client devices 355 by way of a network 350. The client device 355 is similar to that of the client device 120 (FIG. 1) according to one or more examples. Various data may be stored in a data store 315 that may be accessible to the computing device as well as certain processing modules, including a slope calculating module 335, a slope correlation module 340, a data projection module 345, a seasonality estimation module 346 and a bounds calculating module 348. One or more computing devices 367 may include servers 368, web servers 370 for receiving requests and serving content in response thereto and retail transaction servers 375 to handle retail transactions which may include sales transactions, product catalogs, shopping carts and other retail functionality. Each server may include an operating system that provides executable program instructions for the general administration and operation of that server and typically may include a computer-readable medium storing instructions that allow the server to perform its intended functions, when executed by a processor of the server.

One or more data archives 378 may be in data communication with the computing device 310 as well as with the server 367. The data archive 380 may contain one or more data stores 380 for the purpose of long term storage of past metric data. The data store 380 may be representative of a plurality of data stores which may contain metric data 382 that may be of any type of relevant metric at any relevant level of granularity. Metric data 382 may be made available to the computing device 310 for use in the computing device's 310 services and processes. Metric data 382 may be generated whenever the server 367 executes some type of event, such as a web page request, or a customer transaction. Alternatively, the metric data may be sampled periodically on a time interval basis. Metrics related to server 367 events may be stored in the data archive 380 as metric data 382.

In some examples, metric data 382 may be accumulated in the data store 380 when the data store 380 receives metric data 382 from the server 367. The amount of metric data 382 received over time may overwhelm the amount of storage available within the data store 380. In this type of situation instituting a retention policy may be desirable to manage the amount of time that metric data 382 is being stored on the data store 380. In order to retain as much metric history as possible, metric data 382 may be aggregated to form metric data 382 that represents a lower granularity than the metric data 382 was originally stored for. To illustrate, the metric data 382 that is stored to the data store 380 by the server 367 may represent a time period of one minute. This one minute data 388 may be a fine level of granularity stored in the data store 380 and a retention policy may state that the one minute data is stored for several weeks, for example. After several weeks, the one minute data 388 may be aggregated with neighboring one minute data 388 to form metric data 380 that represents one hour data 386. The one minute data 388 may then be purged from the data store 380. The same retention policy may further state that one hour data 386 is retained in the data store 380 for several calendar quarters. Using the same process described, the one hour data 386 may be aggregated to form metric data 382 that represents one day of metric data 382 and the one hour data 386 may be purged from the data store 380.

In another example configuration, one minute data, five minute data, one hour data and one day data may be recorded at the same time. Thus, when the one minute data is discarded, no additional computations may be made to compute the five minute or one hour data because that data may have been recorded earlier.

The computing device 310 may obtain metric data 382 from the data archive 378 for the purpose of estimating historical metric data. Existing metric data 382 may be identified for the time period that is to be estimated and may be retrieved from the data store 380. The identified metric data 382 may then be placed in the data store 315 of the computing device 210. The data store 315 may store metric data for the purpose of short term storage and manipulation of metric data, whereas the data store 380 may be tasked with storing metric data for archive purposes. The metric data 382 retrieved may include but is not limited to, one minute data 388, five minute data 387, one hour data 386 and one day data 384. The retrieved metric data 382 may be placed within the data store 315 of the computing device 310, (i.e., one day data 320, one hour data 325, five minute data 328 and one minute data 330).

Data retrieved and stored in the data store 315 may include granular metric data that may be of one day data 320, one hour data 325, five minute data 328 and one minute data 330. One day data 320 may represent metric data covering a time span of twenty-four hours, one hour data 325 may represent metric data that covers a time span of one hour, five minute data 328 may represent metric data that covers a time span of five minutes and in this example, one minute data 330 is the finest level of granularity in the data store 315 representing metric data of a one minute time span.

The modules executing on the computing device 310 may include a slope calculating module 335, a slope correlation module 340, a data projection module 345, a trend calculating module 346, a seasonality estimation module 347 and a bounds calculating module 348. The slope calculating module 335 may calculate a slope for granular data for a determined time period. For instance, the slope correlation module 340 may obtain a plurality of slopes and then may correlate the multiple slopes into a correlated slope. In addition, the data projection module 345 may infer or apply a slope from existing fine granular metric data in a defined time period from which the slope was calculated to coarse granular metric data in a past time period.

The slope calculating module 335 may obtain metric data 318 for one or more defined time periods from the data store 315. The granularity of the metric data 315 obtained may be, but is not limited to, one minute data 330, one hour data 325, or one day data 320. For example, any data granularity from one second measurement intervals up to multi-week intervals may be used. The slope calculating module 335 may obtain a plurality of metric data 318 from the data store 315 for which a slope may be calculated for each metric data 318 set obtained. For example, the slope calculating module 335 may obtain one minute data 330 for a defined time period. The slope calculating module 335 may calculate a slope for the one minute data 330 and store the resulting slope back to the data store 315 for use by other modules or processes.

The slope correlation module 340 may obtain a plurality of slopes from the data store 315. These slopes may be derived from multiple fine granular metric data sets in multiple defined time periods. The plurality of slopes may be correlated to form a correlated slope. For example, the slope correlation module 340 may obtain a slope of one minute data 330 for three time periods that are related. These three time periods may be 9 AM on Monday in three succeeding weeks. The three slopes of one minute data 330 may be correlated together to form a single correlated slope. The correlated slope may be stored back onto the data store 315 for use by other modules or processes.

In addition to correlating a plurality of slopes from related time periods (e.g. one minute data 330 slope for succeeding Mondays in a multiple week period), the slope correlation module 340 may correlate a plurality of slopes from the fine granular metric data sets that are not from related time periods. For example, the slope correlation module 340 may obtain a slope of one minute data 330 for a first time period and a slope of one minute data 330 for a second unrelated time period. The slope of one minute data 330 for the first time period may be correlated to the slope of the second one minute data period 330 for the second unrelated time period and the resulting correlated slope may be stored back onto the data store 315 for use by other modules or processes.

The data projection module 345 may obtain a slope for a defined time period from the data store 315. The data projection module 345 may use the correlated slope as applied to historical coarse granular data to estimate a fine granular metric data point within a historical data set for the historical time period. For example, one day data 320, one hour data 325 and five minute data 328 for a defined time period in the past may exist within the data archive 378. But one minute data 388 for the same past time period may no longer exist due to retention policies. The data projection module 345 may obtain a slope for fine granular metric data from the data store 315 created by the modules previously described. The data projection module 345 then may estimate within the computing device environment 310, one or more data points for the one minute data 330 for the past time period using the correlated slope from stored fine granular metric data. The data projection module 345 then may store the estimated data point(s) back to the data store 315, or the estimated data point(s) may be made available to the client device 355 by way of the network 350.

In an additional configuration, the data projection module 345 may use the mean of a maximum bound limit and a minimum bound limit obtained from a coarse granular data set from a historical time period as an anchor on a correlated slope. Using the mean of the bound limits may have the effect of limiting unexpected or erratic results when the correlated slope is used to estimate a fine granular metric data point within a historical data set by keeping the correlated slope from drifting a certain distance from the mean.

Figure 4:
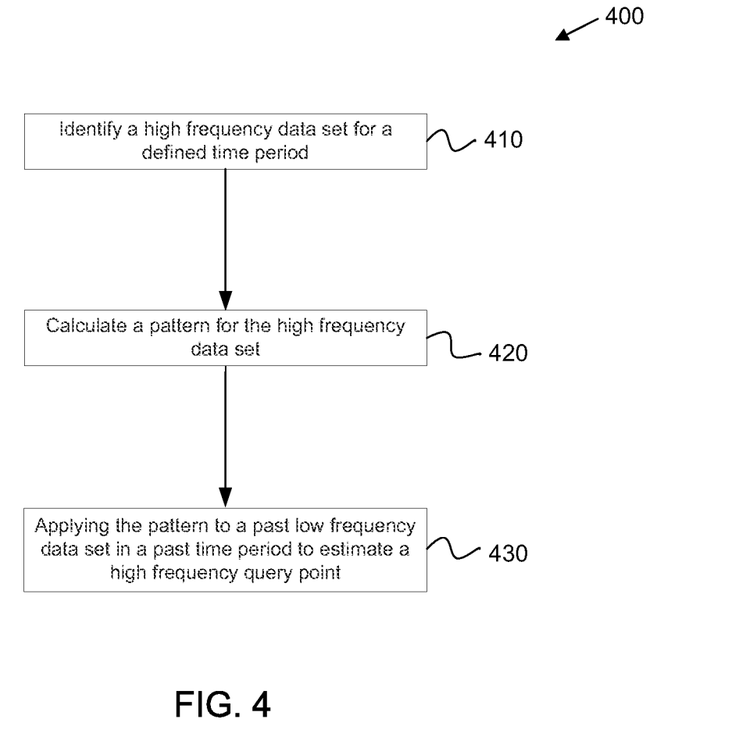
FIG. 4 is a flowchart illustrating an example of a method for estimating historical high frequency data.

Referring next to FIG. 4, an example process 400 is illustrated for estimating a high frequency data point in response to a query in accordance with one example. The flow diagram of FIG. 4 merely provides an example of the many different types of functional arrangements that may be employed to estimate a high frequency query point as described herein. In the discussion that follows, the term high frequency is a term that includes high granularity data and highly sampled data inputs. Similarly, the term low frequency may include low granularity data and low frequency sampled data inputs.

The method may include identifying a plurality of high frequency data sets for a plurality of defined time periods, as in block 410. High frequency data refers to information that is captured at frequent intervals. Rather than capturing a continuous flow of data, information capture is segmented into units of time or sampled at intervals of one minute, one hour or one day, for example. When data is sampled at small time intervals, such as one minute, the data may be considered high frequency data. Whereas when data is sampled at larger time intervals, such as one day, the data may be considered low frequency data. A high frequency query point may refer to a data point where a user or a system may seek to determine the value of a data point that may be estimated for a past high frequency data set.

In one example, a data set may be identified for a defined time period. The defined time period selected may be associated with a past time period for which a high frequency query point is being estimated. As a non-limiting example, for a high frequency query point that is to be estimated for a time that may have occurred six months ago, a more recent data set may be identified that may be associated with the past time period of the high frequency query point to be estimated. For example, the defined time period may be related to the past time period by associating a similar time of day, day of the week, day of the month or time of year between the two periods. Alternatively, the defined time period and the past time period may be unrelated. As a more specific example, if the past time period is 12:00 PM to 1:00 PM on Monday six months ago, a more recent corresponding time period may be 12:00 PM to 1:00 PM on Monday of the current week. As another more specific example, if the high frequency query point to be estimated is for the number of unique visitors who visited a website at 12:30 PM on Monday six months ago, then certain data sets may be identified. The first, a high frequency data set containing the number of unique visitors for the time period of 12:00 PM to 1:00 PM on Monday of the current week and the second, a low frequency data set containing the number of unique visitors for the same time period of 12:00 PM to 1:00 PM on Monday of the current week.

At block 420 a pattern for a high frequency data set may be calculated. The term "pattern" may refer to how data is distributed within a data set and may include a slope or other patterns. Examples, of patterns besides a linear function may include disjoint functions, second order functions, third order functions or other patterns. In another example, a plurality of patterns may be calculated and correlated to form a correlated pattern that may be used in further processes.

The pattern from the previous process may be applied to a low frequency data set in a past time period, as in block 430. This application then may be used to estimate a high frequency query point within the past time period. For example, using the example of the number of unique visitor visits to a website, the pattern may show that the number of unique visits increased over the time period of the pattern. When the pattern is then applied to the low frequency data set of unique visitors for the past time period, the application may result in an estimated query point or points that shows at a high frequency level a specific number of unique visitors or that unique visitors were increasing at that point in time.

In an example, an upper and lower bound may have been identified from the low frequency data set and the pattern may be set to fit between the upper and lower bounds. Further, the maximum bound limit and/or the minimum bound limit identified using the low frequency data set in the past time period may be used as a constraint on an estimated high frequency data query point. This may place a limitation on the pattern and may prevent unexpected or erratic results when applying the pattern to estimate a high frequency data query point. In another example, a mean of the maximum bound limit and the minimum bound limit may be used as an anchor on a pattern as described herein.

The processes involved in estimating a high frequency query point may be repeated any number of times in order to estimate past high frequency data sets that are meaningful and useful.

Figure 5:
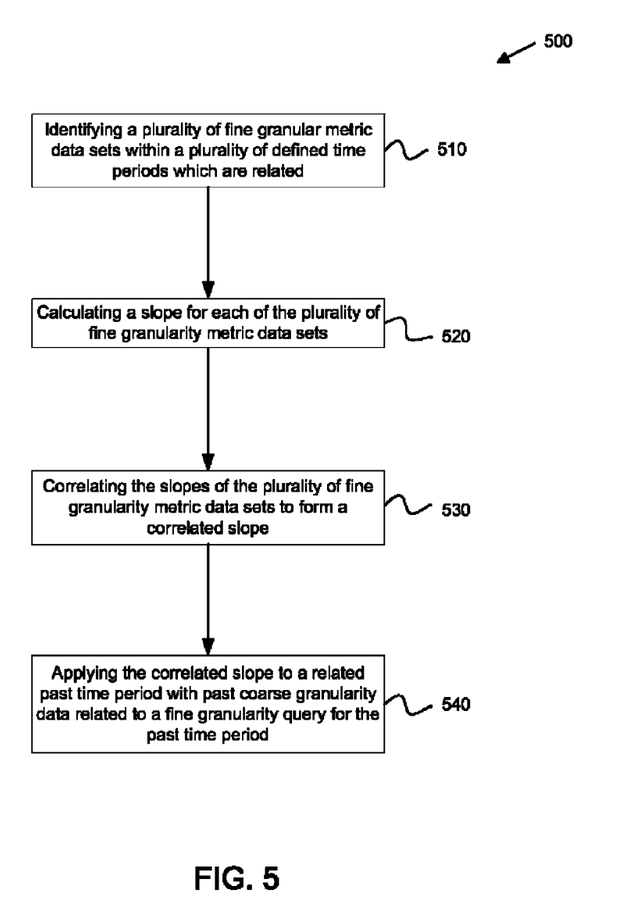
FIG. 5 is another flowchart illustrating an example of a more specific method for estimating historical data.

FIG. 5 is a flowchart that illustrates an example method for estimating historical metric data. The method may include the operation of identifying a plurality of fine granular metric data sets within a plurality of defined time periods which are related, as in block 510. The plurality of fine granular metric data sets may be for multiple time periods that are related or the time periods may be unrelated. For example, the fine granular metric data sets may represent CPU (central processing unit) load for a server and the time periods for the fine granular metric data sets may be 10:00 PM to 10:05 PM on a Friday evening for multiple successive weeks. Alternatively, the time periods may be relatively unrelated and selected randomly from the data store while maintaining an equal time length for each selected period.

A slope may be calculated for each of the plurality of fine granularity metric data sets, as in block 520. The slope may be calculated using sampled data points contained in the fine granular metric data sets representing metrics. The slope may be calculated using algebraic methods or more complex higher order mathematical slope computational functions. The slopes of the plurality of fine granularity metric data sets may be correlated to form a correlated slope, as in block 530. The slopes may be correlated using averaging, interpolation, weighting, intelligent selection, or other correlation methods.

The correlated slope may be applied to or inferred to a related past time period using past coarse granularity data related to a fine granularity query for the past time period, as in block 540. The fine granularity query may request the estimation of one or multiple metric points in the past during a past time period. Referring again to the example above, the fine granularity query may ask for a series of data points from two years ago on Friday, February 1 between 10:00 PM and 10:05 PM. This past time period may be related to the fine granular metric sets because the day of the week (i.e., Friday) and time period length are the same. The correlated slope may then be used as bounded by the upper and lower bounds in the past time period of the past coarse granularity data that exist in a data store. In other words, the slope may be a relative measure that may be scaled, constrained and/or adjusted by the past coarse granularity data for the past time period. Thus, data points may be provided at a fine granularity levels for past time periods where the data already been discarded.

While the flow diagrams illustrated in FIGS. 4 and 5 may imply a specific order of execution, the order of execution may differ from what is illustrated. For example, the order of two or more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Figure 6:
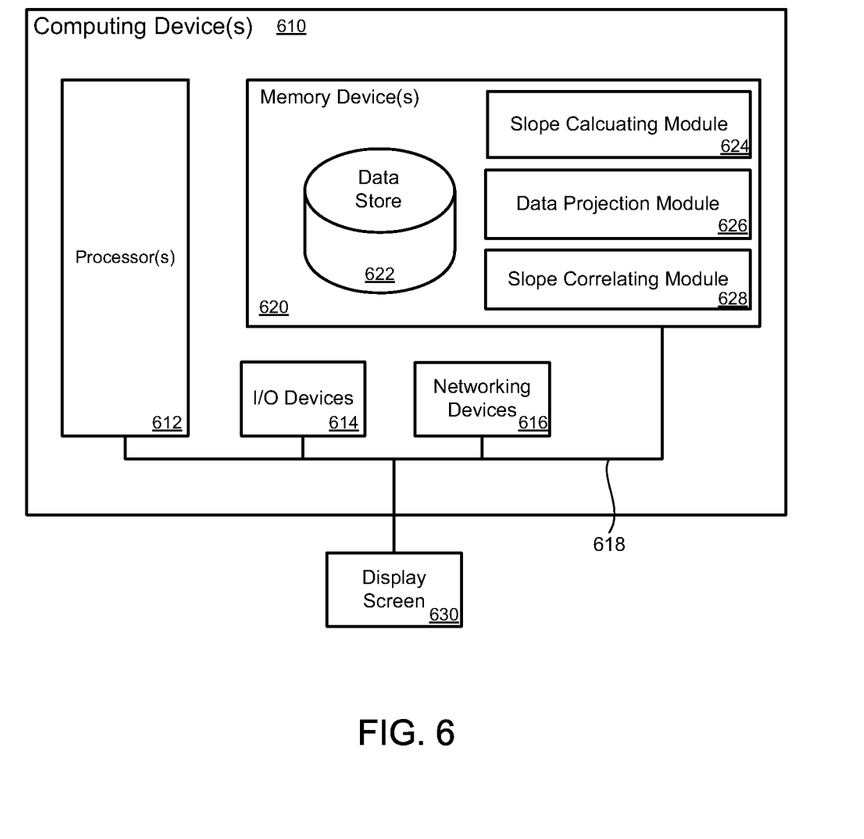
FIG. 6 is a block diagram illustrating one example of a computing device that may be used in estimating historical data.

FIG. 6 illustrates a computing device 610 on which modules of this technology may execute. A computing device 610 is illustrated on which a high level example of the technology may be executed. The computing device 610 may include one or more processors 612 that are in communication with memory devices 620. The computing device may include a local communication interface 618 for the components in the computing device. For example, the local communication interface may be a local data bus and/or any related address or control busses as may be desired.

The memory device 620 may contain modules that are executable by the processor(s) 612 and data for the modules. Located in the memory device 620 are modules executable by the processor. For example, a slope calculating module 624, a data projection module 626 and a slope correlation module 628 and other modules may be located in the memory device 620. The modules may execute the functions described earlier. A data store 622 may also be located in the memory device 620 for storing data related to the modules and other applications along with an operating system that is executable by the processor(s) 612.

Other applications may also be stored in the memory device 620 and may be executable by the processor(s) 612. Components or modules discussed in this description that may be implemented in the form of software using high programming level languages that are compiled, interpreted or executed using a hybrid of the methods.

The computing device may also have access to I/O (input/output) devices 614 that are usable by the computing devices. An example of an I/O device is a display screen 630 that is available to display output from the computing devices. Other known I/O device may be used with the computing device as desired. Networking devices 616 and similar communication devices may be included in the computing device. The networking devices 616 may be wired or wireless networking devices that connect to the internet, a LAN, WAN, or other computing network.

The components or modules that are shown as being stored in the memory device 620 may be executed by the processor 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory 620 may represent multiple memory units that operate in parallel to the processing circuits. This may provide parallel processing channels for the processes and data in the system. The local interface 618 may be used as a network to facilitate communication between any of the multiple processors and multiple memories. The local interface 618 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for estimating historical metric data, comprising: under control of a processor and memory configured with executable instructions,
    identifying a plurality of fine granular metric data sets for a plurality of defined time periods which are related;
    calculating a slope for each of the plurality of fine granularity metric data sets;
    correlating slopes of the plurality of fine granularity metric data sets to form a correlated slope; and
    applying the correlated slope to a related past time period with past coarse granularity data related to a fine granularity query for the past time period.

2. The method as in claim ter comprising estimating a fine granularity query point for the fine granularity query using the correlated slope inferred to the past coarse granularity data set.

3. The method as in claim 1, further comprising estimating seasonality for the plurality of fine granularity data sets and fitting the correlated slope to the seasonality.

4. The method as in claim 2, further comprising calculating a maximum bound limit and a minimum bound limit of the past coarse granularity data set.

5. The method as in claim 4, wherein estimating a fine granularity query point further comprises using the maximum bound limit and the minimum bound limit to estimate the fine granularity query point for the fine granularity query.

6. The method as in claim 4, wherein estimating a fine granularity query point further comprises using the maximum bound limit as a constraint on the correlated slope.

7. The method as in claim 4, wherein estimating a fine granularity query point further comprises using the minimum bound limit as a constraint on the correlated slope.

8. The method as in claim 4, wherein estimating a fine granularity query point further comprises using a mean of the maximum bound limit and the minimum bound limit as an anchor on the correlated slope.

\* \* \* \* \*